United States Patent
Pacheco et al.

(10) Patent No.: US 9,308,998 B1
(45) Date of Patent: Apr. 12, 2016

(54) REMOVABLE AIRCRAFT HEADREST

(71) Applicant: AMI INDUSTRIES, INC., Colorado Springs, CO (US)

(72) Inventors: Chad R. Pacheco, Colorado Springs, CO (US); Timothy Brownsberger, Colorado Springs, CO (US); Donald Pinkal, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 14/589,503

(22) Filed: Jan. 5, 2015

(51) Int. Cl.
*A47C 1/10* (2006.01)
*A47C 7/36* (2006.01)
*A61G 15/00* (2006.01)
*B60R 22/28* (2006.01)
*B64D 11/06* (2006.01)
*B60N 2/48* (2006.01)

(52) U.S. Cl.
CPC .......... *B64D 11/0642* (2014.12); *B60N 2/4879* (2013.01); *B60N 2/48* (2013.01); *B60N 2/4805* (2013.01); *B60N 2/4811* (2013.01); *B60N 2/4885* (2013.01); *B60N 2002/4897* (2013.01)

(58) Field of Classification Search
CPC ................. B60N 2/48; B60N 2/4808; B60N 2002/4897; B60N 2/4844; B60N 2/48052; B60N 2/4885; B60N 2/4805; B60N 2/4811
USPC ........... 297/391, 410, 216.12, 394, 396, 397, 297/401, 405
See application file for complete search history.

(56) References Cited

U.S. PATENT DOCUMENTS

| | | | | |
|---|---|---|---|---|
| 4,519,650 A * | 5/1985 | Terada | .............. | B60N 2/682 297/410 |
| 4,626,028 A * | 12/1986 | Hatsutta | .............. | B60N 2/2222 297/284.1 |
| 4,674,797 A * | 6/1987 | Tateyama | ............. | B60N 2/4847 297/391 |
| 4,976,493 A * | 12/1990 | Frankila | ............... | B60N 2/4817 248/408 |
| 5,671,976 A * | 9/1997 | Fredrick | ................ | B60N 2/688 297/284.1 |
| 5,975,637 A * | 11/1999 | Geuss | ................... | B60N 2/002 297/216.12 |
| 6,045,181 A * | 4/2000 | Ikeda et al. | .......... | B60N 2/4847 297/216.12 |
| 6,789,846 B2 * | 9/2004 | Humer | ................ | B60N 2/4228 297/216.12 |
| 7,097,242 B2 * | 8/2006 | Farquhar | .............. | B60N 2/4228 297/216.12 |
| 7,255,401 B2 * | 8/2007 | Yokoyama | ........... | B60N 2/4817 297/410 |
| 7,338,130 B2 * | 3/2008 | Daume | ................ | B60N 2/4814 297/391 |
| 2003/0057758 A1 * | 3/2003 | Baumann | ............. | B60N 2/4885 297/391 |
| 2004/0108766 A1 * | 6/2004 | Baker | .................. | B60N 2/4844 297/408 |

* cited by examiner

*Primary Examiner* — Chi Q Nguyen
(74) *Attorney, Agent, or Firm* — Snell & Wilmer, LLP

(57) ABSTRACT

Systems and methods are disclosed herein for an aircraft seat with a removable headrest. The headrest may automatically lock in place in response to being inserted within the seat frame. The headrest may be removed by pressing on an upper backrest in the seat. The upper backrest may release a locking mechanism, and the headrest may be pulled upward in order to remove the headrest from the seat.

13 Claims, 5 Drawing Sheets

REMOVABLE AIRCRAFT HEADREST

FIELD

The present disclosure relates generally to aircraft seats. More particularly, the present disclosure relates to removable headrests for aircraft seats.

BACKGROUND

Certain aircraft cabin attendant seats are designed to include a locking removable headrest. The seats and locking removable headrests may be subjected to rigorous testing, in which the seats must perform adequately under substantial force and warping. Prior designs included a pin or latch on each side of the headrest which could be unlocked in order to remove the headrest and manually engaged after reinserting the headrest to lock the headrest in place.

SUMMARY

A seat may comprise a seat frame, a backrest, a headrest, and a locking mechanism. The headrest may comprise a bayonet. The locking mechanism may be configured to lock the bayonet within the seat frame. The locking mechanism may be configured to release in response to a pressure on the backrest.

In various embodiments, the locking mechanism may comprise a linkage and a pawl. The linkage may comprise a cantilevered tab configured to transmit a force from the backrest to the pawl. The pawl may be biased by a torsion spring. The pawl may comprise a cut-out. The linkage may comprise a release member located within the cut-out. The torsion spring may be configured to cause the pawl to rotate into a ratchet slot in the bayonet in response to the bayonet being inserted within the seat frame. The seat may comprise a set screw and a tightening pin configured to decrease vibrations between the bayonet and the seat frame.

An aircraft seat may comprise a seat frame, a pawl, a torsion spring, a linkage, and an upper backrest. The pawl may be coupled to the seat frame. The pawl may comprise a curved cut-out. The torsion spring may be coupled to the pawl. The torsion spring may comprise a first end in contact with the seat frame and a second end in contact with a lever on the pawl. The pawl may be biased rotationally by the torsion spring. The linkage may be coupled to the seat frame. The linkage may comprise a main body, a release member extending from the main body and located within the curved cut-out in the pawl, and a cantilevered tab perpendicular to the main body. The upper backrest may be biased in a forward position by the cantilevered tab.

In various embodiments, the seat may comprise a bayonet locked within the seat frame by the pawl. The pawl may be located within a ratchet slot in the bayonet. A travel stop may be coupled to the seat frame. The travel stop may be configured to limit rearward movement of the upper backrest. The pawl may be configured to unlock in response to a pressure on the upper backrest. The pawl may be configured to automatically lock a bayonet within the seat frame in response to the bayonet being inserted within the seat frame. A set screw and a tightening pin may be configured to decrease vibrations between a bayonet and the seat frame.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for an aircraft seat with a removable headrest. The headrest may automatically lock in place in response to being inserted within the seat frame. The headrest may be removed by pressing on an upper backrest in the seat. The upper backrest may release a locking mechanism, and the headrest may be pulled upward in order to remove the headrest from the seat.

Figure 1:
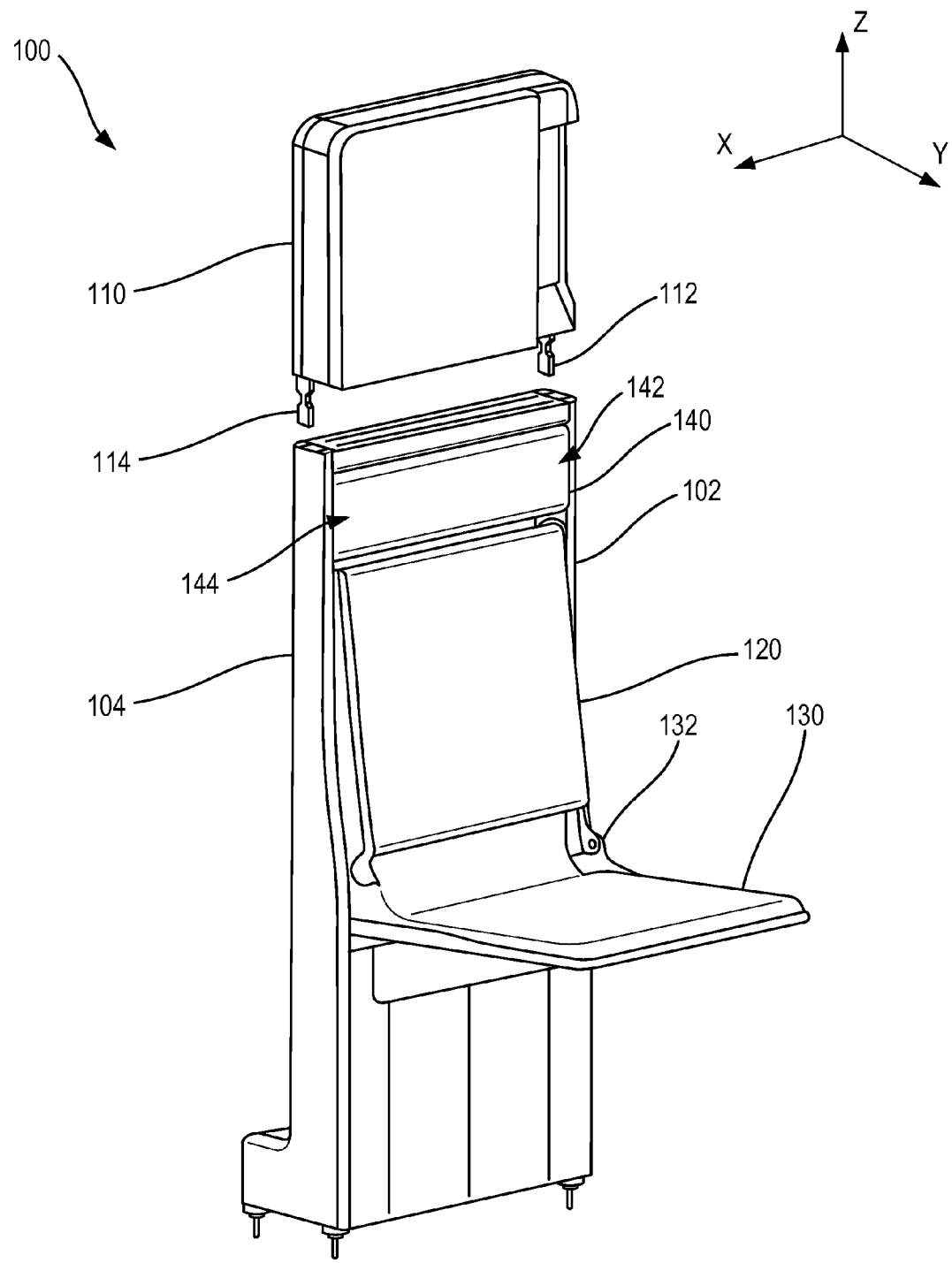
FIG. 1 illustrates a seat with a removable headrest according to various embodiments.

Referring to FIG. 1, a seat 100 with a removable headrest 110 is illustrated according to various embodiments. X-y-z axes are shown for ease of illustration. As used herein, the term forward represents the positive y-direction, the term right (with reference to a hypothetical person sitting in the seat 100) represents the positive x-direction, the term left represents the negative x-direction, the term down represents the negative z-direction, and the term up represents the positive z-direction. In various embodiments, the seat 100 may be a cabin attendant seat for an aircraft. However, those skilled in the art will recognize that the mechanisms discussed herein may be compatible with any type of seat with a removable headrest. Seat 100 may comprise a seat back 120 and a seat bottom 130. Seat bottom 130 may pivot about a hinge 132, such that the seat bottom 130 may be stowed against the seat back 120 when the seat bottom 130 is not in use.

The seat 100 may comprise a left seat frame 102 and a right seat frame 104. The headrest 110 may comprise a left bayonet 112 and a right bayonet 114. The left bayonet 112 and the right bayonet 114 may extend downward from the headrest 110. The left bayonet 112 may be configured to be inserted into the left seat frame 102, and the right bayonet 114 may be configured to be inserted into the right seat frame 104. The seat 100 may comprise a locking mechanism, such that in response to being inserted into the left seat frame 102 and the right seat frame 104, the left bayonet 112 and the right bayonet 114 may be locked in place. The locking mechanism may prevent the headrest 110 from being detached from the seat 100.

The seat 100 may comprise an upper backrest 140. The upper backrest 140 may extend between the left seat frame 102 and the right seat frame 104. The upper backrest 140 may be located above the seat back 120. The upper backrest 140 may be part of a release mechanism to unlock the locking mechanism and remove the headrest 110 from the seat 100. In response to pressure on a left side 142 of the upper backrest 140, the release mechanism may unlock the left bayonet 112. In response to pressure on a right side 144 of the upper backrest 140, the release mechanism may unlock the right bayonet 114. The headrest 110 may be removed by applying pressure to one side of the upper backrest 140 and partially removing the corresponding bayonet, then applying pressure to the opposite side of the upper backrest 140 and removing the opposite bayonet. In various embodiments, in response to pressure in the aft direction (negative y-direction) on both the left side 142 and the right side 144 of the upper backrest 140, both the left bayonet 112 and the right bayonet 114 may be unlocked, and the headrest 110 may be removed by pulling upward on the headrest. In various embodiments, the left bayonet 112 and the right bayonet 114 may lock and unlock independently from each other. Thus, even in the event of failure of one locking mechanism, the headrest 110 may still be locked in place.

Figure 2:
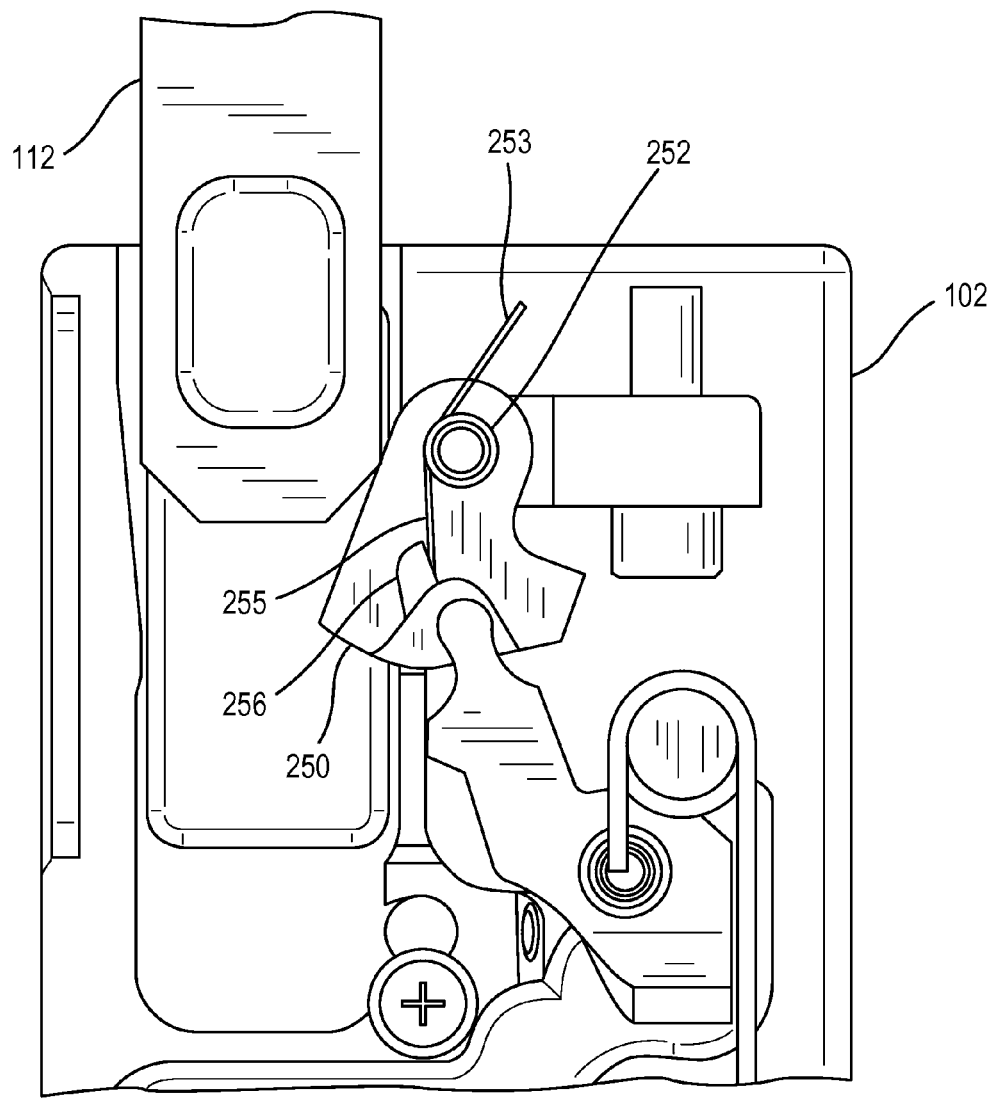
FIG. 2 illustrates a side view of a bayonet partially inserted into a seat frame according to various embodiments.

Referring to FIG. 2, a side view of the left bayonet 112 partially inserted into the left seat frame 102 is illustrated according to various embodiments. As the left bayonet 112 is inserted into the left seat frame 102, the left bayonet 112 may contact a pawl 250. The pawl 250 may be biased in a clockwise direction by a torsion spring 252. The torsion spring 252 may comprise a first end 253 coupled to the left seat frame 102, and a second end 255 coupled to a lever 256 on the pawl 250. The left bayonet 112 may apply a torque on the pawl 250 in the counter-clockwise direction which is larger than the torque from the torsion spring 252, causing the pawl 250 to rotate in the counter-clockwise direction. The left bayonet 112 may slide against the pawl 250 until the left bayonet 112 is fully inserted into the left seat frame 102.

Figure 3:
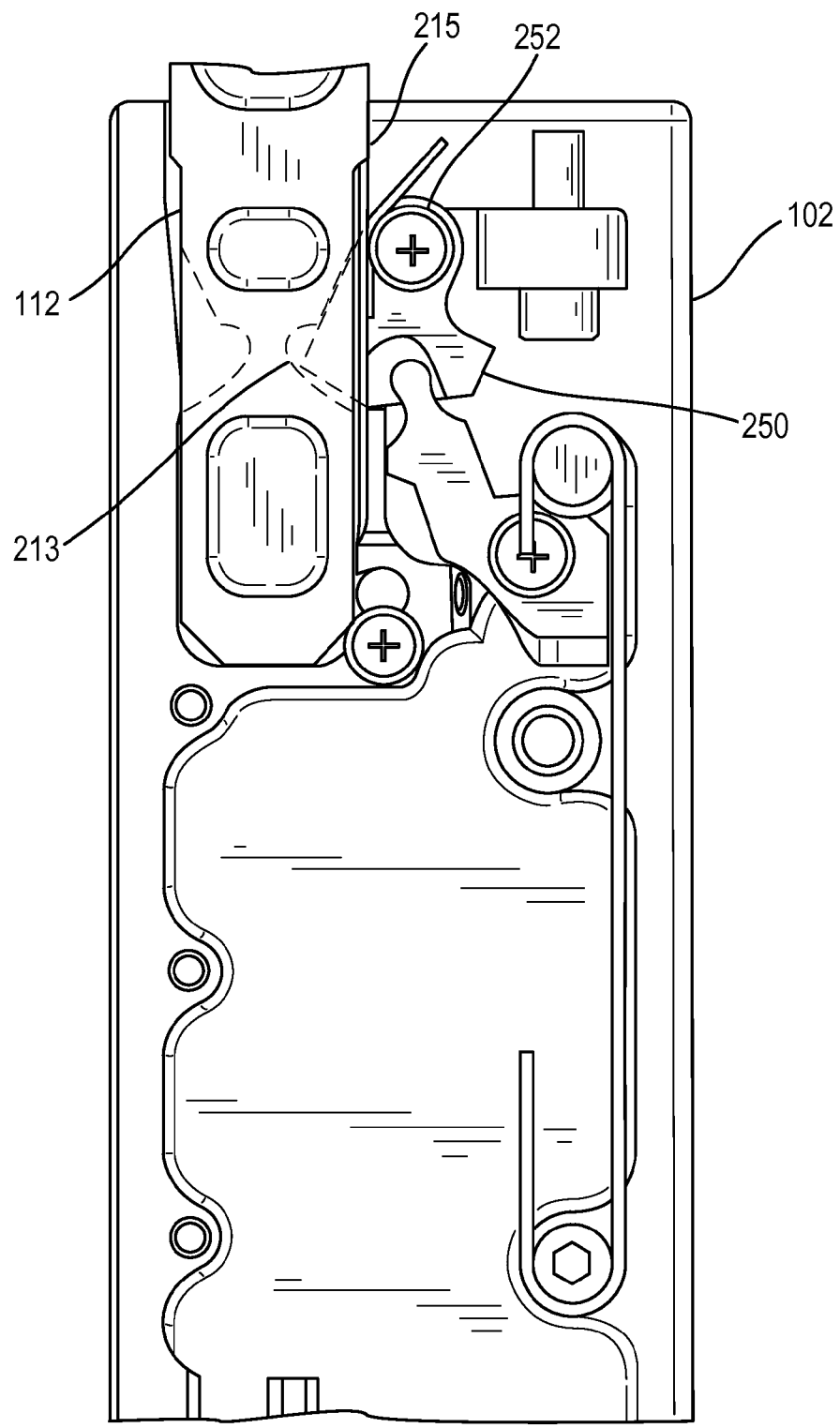
FIG. 3 illustrates a side view of the bayonet locked within the seat frame according to various embodiments.

Referring to FIG. 3, a side view of the left bayonet 112 locked within the left seat frame 102 is illustrated according to various embodiments. The left bayonet 112 is fully inserted within the left seat frame 102. The left bayonet 112 may comprise a ratchet slot 213. The ratchet slot 213 may be recessed from a front face 215 of the left bayonet 112. The ratchet slot 213 may be configured to receive the pawl 250. In response to the left bayonet 112 being fully inserted into the left seat frame 102, the front face 215 of the left bayonet 112 may no longer apply a torque on the pawl 250, and the torsion spring 252 may cause the pawl 250 to rotate clockwise into the ratchet slot 213. Interference between the pawl 250 and the ratchet slot 213 prevents the left bayonet 112 from being removed from the left seat frame 102. Thus, the pawl 250 locks the left bayonet 112 within the left seat frame 102. The torsion spring 252 may prevent the pawl 250 from rotating counter-clockwise out the ratchet slot 213.

Figure 4:
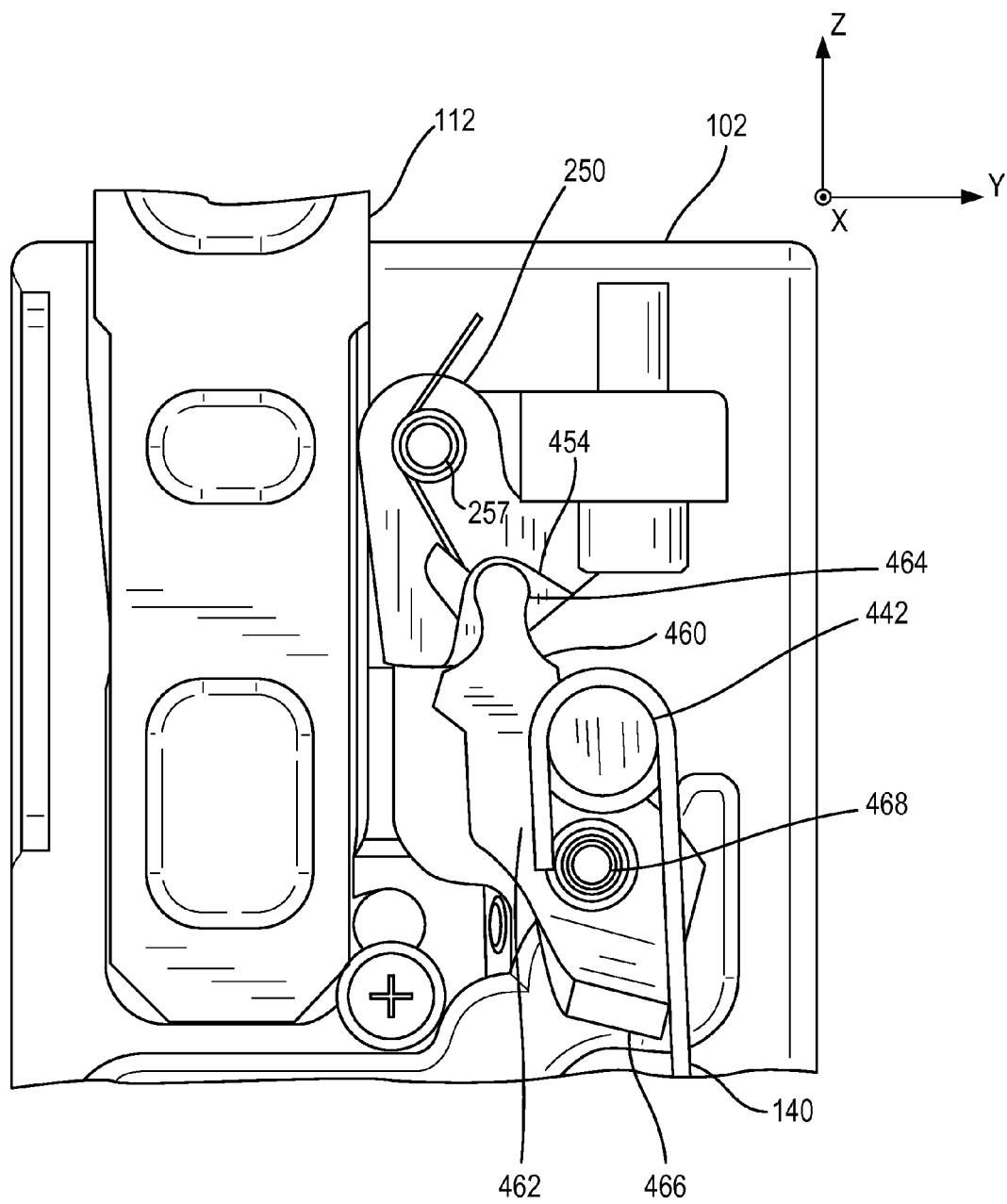
FIG. 4 illustrates a side view of the bayonet in an unlocked state according to various embodiments.

Referring to FIG. 4, a side view of the left bayonet 112 in the unlocked state is illustrated according to various embodiments. A linkage 460 may be coupled to the left seat frame 102. The linkage 460 is configured to transmit a force between the upper backrest 140 and the pawl 250. The linkage 460 may comprise a main body 462. The main body 462 may be substantially coplanar with the pawl 250. A release member 464 may extend from and be coplanar with the main body 462. The release member 464 may be located within a cut-out 454 in the pawl 250. The cut-out 454 may be curved such that the release member 464 may remain within the cut-out 454 in response to the linkage 460 and pawl 250 rotating relative to one another. The linkage 460 may comprise a cantilevered tab 466 extending substantially perpendicular from the main body 462 in a direction away from the left seat frame 102. The cantilevered tab 466 may be configured to transmit a force from the upper backrest 140, through the main body 462 and the release member 464 to the pawl 250.

The upper backrest 140 may be depressed in a rearward direction (negative y-direction) in order to unlock the left bayonet 112. The upper backrest 140 may contact the cantilevered tab 466, applying a torque on the linkage 460 in the clockwise direction about a bolt 468. The linkage 460 may rotate in the clockwise direction, causing the release member 464 to contact the cut-out 454 and apply a torque on the pawl 250 in a counter-clockwise direction about the pivot joint 257. The pawl 250 may rotate in a counter-clockwise direction, and the left bayonet 112 may be pulled upward out of the left seat frame 102. Upon releasing the pressure on the upper backrest 140, the torsion spring 252 may cause the pawl 250 to rotate back in the clockwise direction, in turn causing the linkage 460 to rotate in the counter-clockwise direction, and forcing the upper backrest 140 back to the undepressed position. In various embodiments, the upper backrest 140 may curve around a post 442. The post 442 may be biased in the forward direction by a spring. Upon releasing the pressure on the upper backrest 140, the post may force the upper backrest 140 back to the undepressed position.

Figure 5:
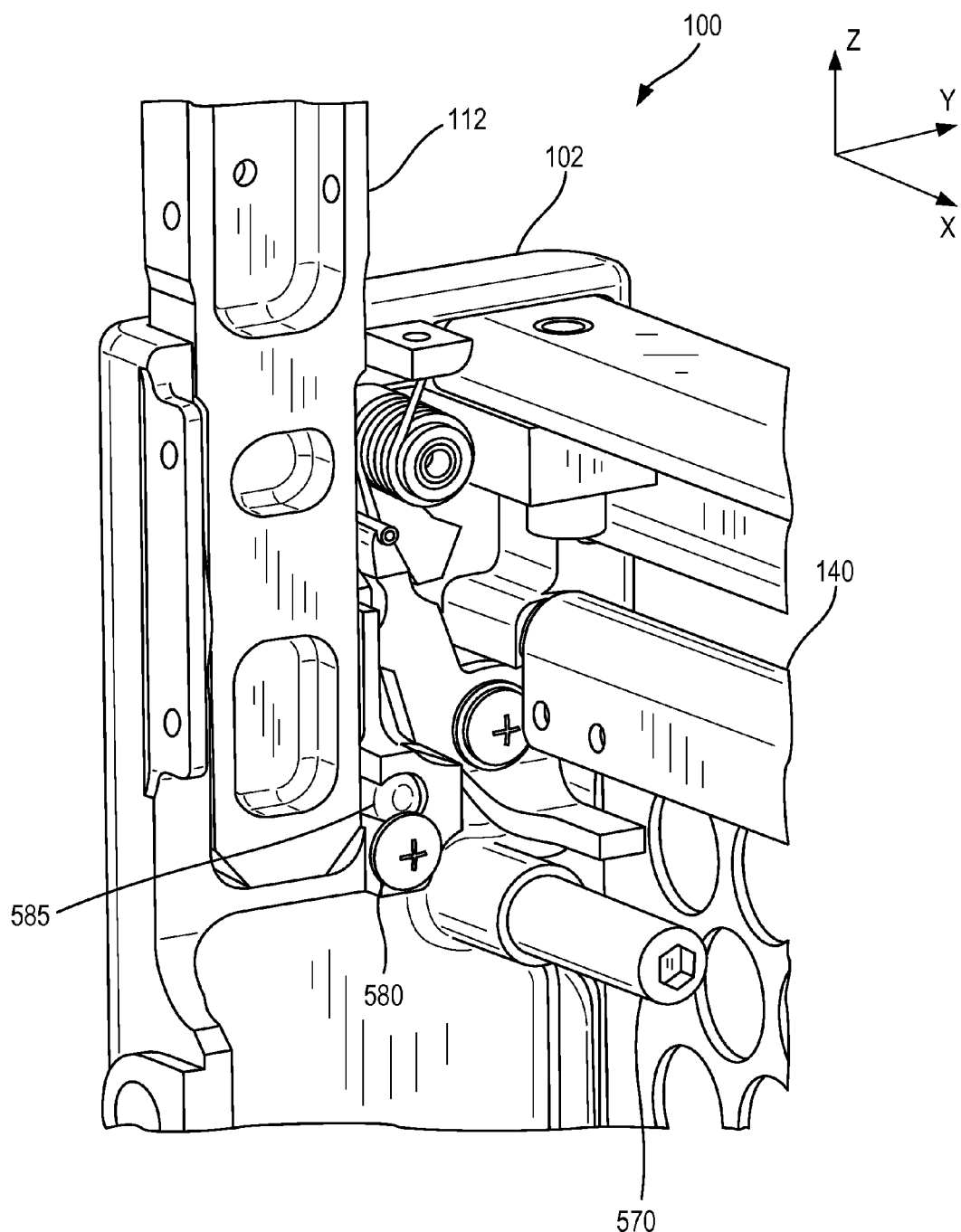
FIG. 5 illustrates a perspective view of the bayonet in an unlocked state according to various embodiments.

Referring to FIG. 5, a perspective view of the left bayonet 112 in the unlocked position is illustrated according to various embodiments. In order to remove the left bayonet 112, the upper backrest 140 may be pressed in the rearward direction. A travel stop 570 may be coupled to the left seat frame 102. The upper backrest 140 may contact the travel stop 570, and the travel stop may prevent further rearward movement of the upper backrest 140.

In various embodiments, the seat 100 may comprise a tightening pin 580. A set screw 585 may be located adjacent to the tightening pin 580. The tightening pin 580 and set screw 585 may be calibrated to decrease the amount of vibration of the left bayonet 112 within the left seat frame 102. The left bayonet 112 may be inserted within the left seat frame 102, and the set screw 585 may be tightened, causing the tightening pin 580 to tighten against the left bayonet 112. The set screw 585 may be tightened to decrease vibrations between the left bayonet 112 and left seat frame 102, without applying too much load on the left bayonet 112 which would prevent the left bayonet 112 from being removed from the left seat frame 102. Thus, the manufacturing tolerances may be greater by allowing for the tightening pin 580 and set screw 585 to be adjusted after manufacture of the individual components.

Although the left side of the seat 100 has been described in detail, the right side of the seat 100 may comprise an identical or similar locking mechanism. Additionally, although the seat has been described primarily with reference to aircraft applications, the present disclosure may be utilized in any situation in which a locking removable headrest is desirable.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A seat comprising:
 a seat frame;
 a backrest;
 a headrest comprising a bayonet; and
 a locking mechanism configured to lock the bayonet within the seat frame, wherein the locking mechanism is configured to release the bayonet in response to a pressure on an upper portion of the backrest, the locking mechanism comprising:
  a pawl coupled to the seat frame, wherein the pawl comprises a cut-out;
  a spring coupled to the pawl, the spring comprising a first end in contact with the seat frame and a second end in contact with a lever on the pawl, wherein the pawl is biased by the spring; and
  a linkage coupled to the seat frame, the linkage comprising a main body, a release member extending from the main body and located within the cut-out in the pawl, and a cantilevered tab perpendicular to the main body, wherein the upper portion of the backrest is biased in a forward position by the cantilevered tab.

2. The seat of claim 1, wherein the cantilevered tab is configured to transmit a force from the backrest to the pawl.

3. The seat of claim 1, wherein the pawl is rotationally biased by the spring.

4. The seat of claim 1, wherein the cut-out is a curved cut-out.

5. The seat of claim 1, wherein the spring comprises a torsion spring configured to cause the pawl to rotate into a ratchet slot in the bayonet in response to the bayonet being inserted within the seat frame.

6. The seat of claim 1, further comprising a set screw and a tightening pin configured to decrease vibrations between the bayonet and the seat frame.

7. An aircraft seat comprising:
 a seat frame;
 a pawl coupled to the seat frame, wherein the pawl comprises a curved cut-out;
 a torsion spring coupled to the pawl, the torsion spring comprising a first end in contact with the seat frame and a second end in contact with a lever on the pawl, wherein the pawl is biased rotationally by the torsion spring;
 a linkage coupled to the seat frame, the linkage comprising a main body, a release member extending from the main body and located within the curved cut-out in the pawl, and a cantilevered tab perpendicular to the main body; and
 an upper backrest, wherein the upper backrest is biased in a forward position by the cantilevered tab.

8. The aircraft seat of claim 7, further comprising a bayonet locked within the seat frame by the pawl.

9. The aircraft seat of claim 8, wherein the pawl is located within a ratchet slot in the bayonet.

10. The aircraft seat of claim 8, further comprising a travel stop coupled to the seat frame, wherein the travel stop is configured to limit rearward movement of the upper backrest.

11. The aircraft seat of claim 7, wherein the pawl is configured to unlock in response to a pressure on the upper backrest.

12. The aircraft seat of claim 7, wherein the pawl is configured to automatically lock a bayonet within the seat frame in response to the bayonet being inserted within the seat frame.

13. The aircraft seat of claim 7, a set screw and a tightening pin configured to decrease vibrations between a bayonet and the seat frame.

* * * * *